US009336571B2

(12) United States Patent
Wu et al.

(10) Patent No.: US 9,336,571 B2
(45) Date of Patent: May 10, 2016

(54) METHOD AND DEVICE OF SKIN TONE OPTIMIZATION IN A COLOR GAMUT MAPPING SYSTEM

(71) Applicant: Orise Technology Co., Ltd., Hsinchu (TW)

(72) Inventors: Hung-Chu Wu, Hsinchu (TW); Edward Jan-Ruei Lin, New Taipei (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 71 days.

(21) Appl. No.: 14/267,353

(22) Filed: May 1, 2014

(65) Prior Publication Data

US 2014/0334728 A1   Nov. 13, 2014

(30) Foreign Application Priority Data

May 9, 2013   (TW) .............................. 102116515 A (51) Int. Cl.
*G06T 5/00* (2006.01)
*H04N 1/62* (2006.01)

(52) U.S. Cl.
CPC . *G06T 5/00* (2013.01); *H04N 1/628* (2013.01)

(58) Field of Classification Search
None
See application file for complete search history.

(56) References Cited

U.S. PATENT DOCUMENTS

| 6,904,165 | B2 | 6/2005 | Lu |
| 7,986,833 | B2 | 7/2011 | Shen et al. |
| 8,265,389 | B2 | 9/2012 | Hung et al. |
| 2006/0187232 | A1* | 8/2006 | Kempf et al. ............ G09G 5/04 345/591 |

OTHER PUBLICATIONS

Smolka, Bogdan, et al. "Towards automatic redeye effect removal." Pattern Recognition Letters 24.11 (2003): 1767-1785.*

* cited by examiner

*Primary Examiner* — Bhavesh Mehta
*Assistant Examiner* — Menatoallah Youssef
(74) *Attorney, Agent, or Firm* — Bacon & Thomas, PLLC (57) ABSTRACT

In a method of skin tone optimization in a color gamut mapping system, an image signal is first transformed from a predetermined color domain to an HSV color domain for generating an HSV image signal. Next, a skin tone optimization is performed on the HSV image signal for generating an adjusted saturation gain. Then, a color enhancement is performed on the HSV image signal according to the adjusted saturation gain and a color shift signal so as to generate a color enhancement signal. Finally, the color enhancement signal is transformed from the HSV color domain to the predetermined color domain.

8 Claims, 7 Drawing Sheets

```
***********RGB to HSV***********
static double Rgb2Hsv(Color MyColor,string ReturnType)
{
   double r, g, b, min, max, delta;
   double ReturnH = 0; double ReturnS = 0; double ReturnV = 0;
   r = Convert.ToDouble(MyColor.R) / 255;
   g = Convert.ToDouble(MyColor.G) / 255;
   b = Convert.ToDouble(MyColor.B) / 255;
   min = Math.Min(Math.Min(r, g), b);
   max = Math.Max(Math.Max(r, g), b);
   ReturnV = Convert.ToDouble(max);//V
   delta = max - min;
   if ((max != 0) && (delta != 0))
   {
      ReturnS = delta / max;
      if (r == max)
      { ReturnH = (g - b) / delta; }
      else if (g == max)
      { ReturnH = 2 + (b - r) / delta; }
      else
      { ReturnH = 4 + (r - g) / delta; }
      ReturnH = ReturnH * 60;
      if (ReturnH < 0)
      { ReturnH = ReturnH + 360; }
   }
   else
   {
      ReturnS = 0;
      ReturnH = -1;
   }
   if (ReturnType == "H")
   { return (ReturnH); }
   else if (ReturnType == "S")
   { return (ReturnS); }
   else if (ReturnType == "V")
   { return (ReturnV); }
   else
   { return (0); }
}
```

METHOD AND DEVICE OF SKIN TONE OPTIMIZATION IN A COLOR GAMUT MAPPING SYSTEM

BACKGROUND OF THE INVENTION

1. Field of the Invention

The present invention relates to the technical field of image processing and, more particularly, to a method and device of skin tone optimization in a color gamut mapping system.

2. Description of Related Art

Figure 1:
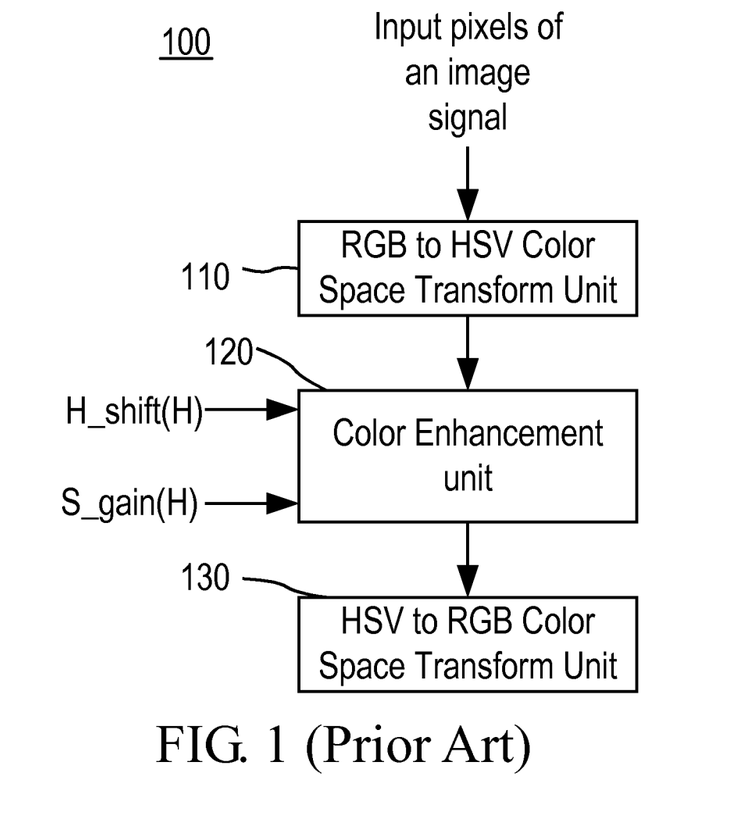
FIG. 1 is a schematic diagram of a typical color enhancement system.

FIG. 1 is a schematic diagram of a typical color enhancement system 100. The color enhancement system 100 is comprised of an RGB to HSV color space transform unit 110, a color enhancement unit 120, and an HSV to RGB color space transform unit 130. The RGB to HSV color space transform unit 110 transforms pixels of an input image signal from an RGB color domain to an HSV color domain. The color enhancement unit 120 enhances the color saturation based on a gain signal S_gain(H) and adjusts the hue based on a color shift signal H_shift(H). The HSV to RGB color space transform unit 130 transforms a signal output by the color enhancement unit 120 from the HSV color domain to the RGB color domain. However, the typical color enhancement system 100 is subjected to an over-enhanced skin tone while the color saturation is enhanced according to the signal S_gain(H), so that the skin tone becomes brown and unnatural after the image processing.

In U.S. Pat. No. 8,265,389 granted to Hung, et al. for a "Color enhancement for digital images", it first enhances the saturation of the YCbCr color domain and detects the shades of different colors, and then uses an exposure index (EI) and color temperature D to thereby correct the enhancement factors for different enhancements. However, such a way cannot separate the skin tones for applying different processes.

In U.S. Pat. No. 6,904,165 granted to Lu for a "Color image processing apparatus and method for color enhancement", it enhances the color saturation without transforming the RGB color domain to the HSV/HSB color domain, but it does not perform any processing for the skin tones.

In U.S. Pat. No. 7,986,833 granted to Shen, et al. for an "Image processing method and apparatus for color enhancement and correction", it avoids generating the clipping effect caused by over-enhancing the color saturation, but it also does not perform any processing for the skin tones and thus the problem of brown and unnatural skin is still encountered.

Therefore, it is desirable to provide an improved color enhancement method and device to mitigate and/or obviate the aforementioned problems.

SUMMARY OF THE INVENTION

The object of the present invention is to provide a method and device of skin tone optimization in a color gamut mapping system, which can avoid the skin tones from becoming brown and unnatural.

According to a feature of the invention, there is provided a method of skin tone optimization in a color gamut mapping system, which is implemented in an image processor. The method includes the steps of: (A) transforming an image signal from a predetermined color domain to an HSV color domain for generating an HSV image signal; (B) performing a skin tone optimization on the HSV image signal for generating an adjusted saturation gain; (C) performing a color enhancement on the HSV image signal according to the adjusted saturation gain and a color shift signal so as to generate a color enhancement signal; and (D) transforming the color enhancement signal from the HSV color domain to the predetermined color domain.

According to another feature of the invention, there is provided a device of skin tone optimization in a color gamut mapping system, which includes an RGB-to-HSV color space transform unit, a skin tone optimization unit, a color enhancement unit, and an HSV-to-RGB color space transform unit. The RGB-to-HSV color space transform unit receives an image signal and transforms the image signal from an RGB color domain to an HSV color domain for generating an HSV image signal. The skin tone optimization unit is connected to the RGB-to-HSV color space transform unit in order to perform a skin tone optimization on the HSV image signal for generating an adjusted saturation gain. The color enhancement unit is connected to the skin tone optimization unit in order to perform a color enhancement on the HSV image signal according to the adjusted saturation gain and a color shift signal so as to generate a color enhancement signal. The HSV-to-RGB color space transform unit is connected to the color enhancement unit in order to transform the color enhancement signal from the HSV color domain to the RGB color domain.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
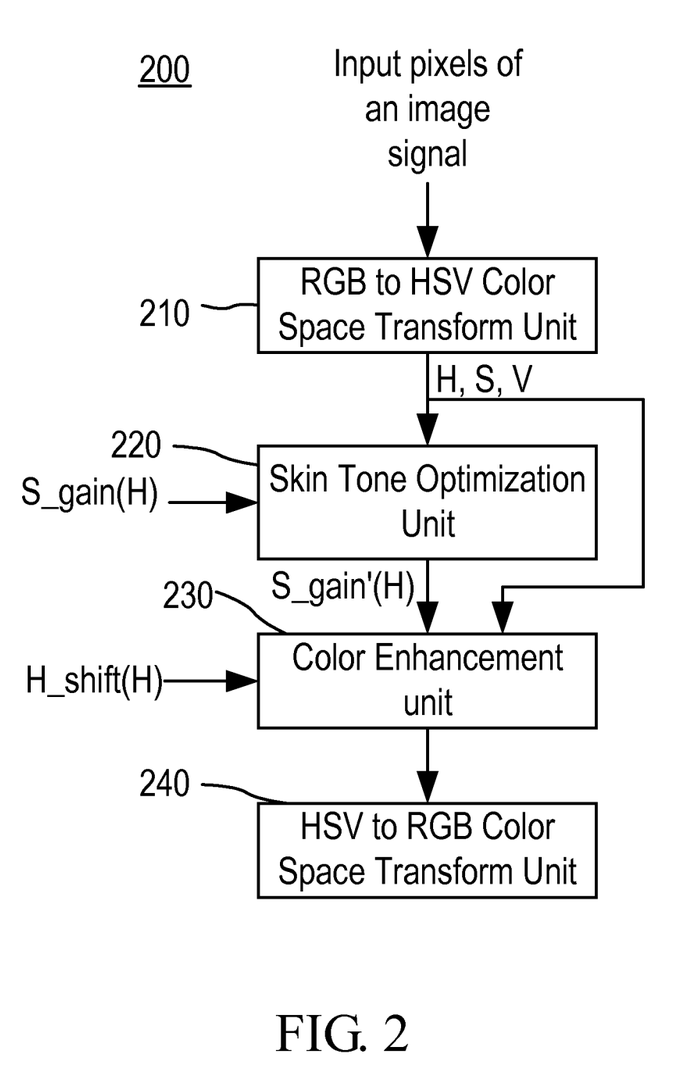
FIG. 2 is a schematic diagram of a device of skin tone optimization in a color gamut mapping system according to the invention.

FIG. 2 is a schematic diagram of a device 200 of skin tone optimization in a color gamut mapping system according to the invention. The device 200 includes an RGB-to-HSV color space transform unit 210, a skin tone optimization unit 220, a color enhancement unit 230, and an HSV-to-RGB color space transform unit 240.

The RGB-to-HSV color space transform unit 210 receives an image signal and transforms the image signal from an RGB color domain to an HSV color domain for generating an HSV image signal.

Figure 3:
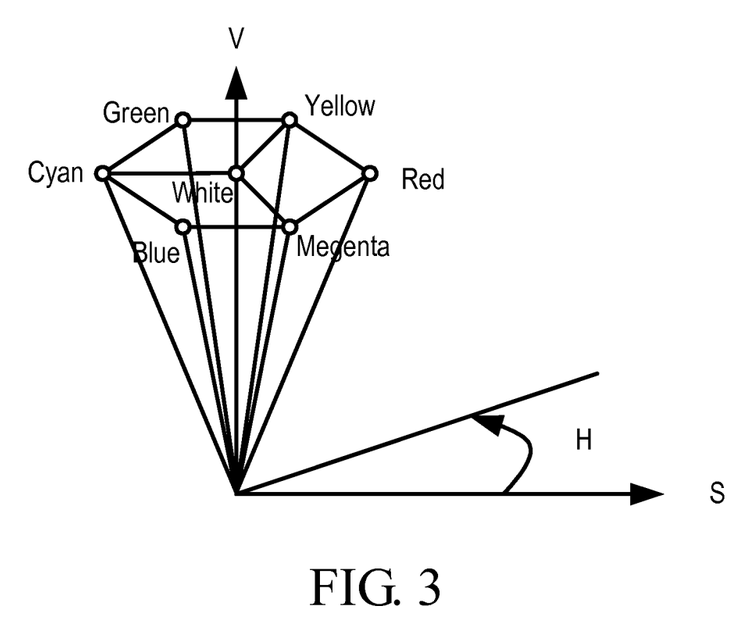
FIG. 3 is a schematic graph of an HSV color space according to the invention.

In an RGB color space, there is a very high correlation between the components thereof. However, in an HSV color space, there is no correlation between the components. As compared with the RGB color space, the HSV color space is not easily affected by the light beams, and thus an RGB to HSV color space transform is required for reducing the light affection on an image and avoiding a wrong decision. FIG. 3 is a schematic diagram of an HSV color space according to the invention, where H (hue) is a full color attribute in which every hue corresponds to a different color and is an angle from 0 degree to 359 degrees; S (saturation) gives a measure of the degree to which a color is diluted by white light in which, when the color is diluted more, it indicates that the saturation is decreased and the position is closer to the center of the color space, and the range is from 0 to 1; V (value) is a brightness of the color in which the value is higher as the brightness is higher and is in a range from 0 to 1. The transform relation of RGB and HSV models can be expressed as the following equation:

$$H1 = \cos^{-1}\left\{\frac{0.5[(R-G)+(R-B)]}{\sqrt{(R-G)^2+(R-B)(G-B)}}\right\},$$

$$H = \begin{cases} H1, & B \leq G \\ 360° - H1, & B > G \end{cases},$$

$$S = \frac{\text{Max}(R, G, B) - \text{Min}(R, G, B)}{\text{Max}(R, G, B)},$$

$$V = \frac{\text{Max}(R, G, B)}{255},$$

where H1 indicates a temporary hue value, R indicates a red component of the image signal, G indicates a green component of the image signal, and B indicates a blue component of the image signal.

Figure 4:
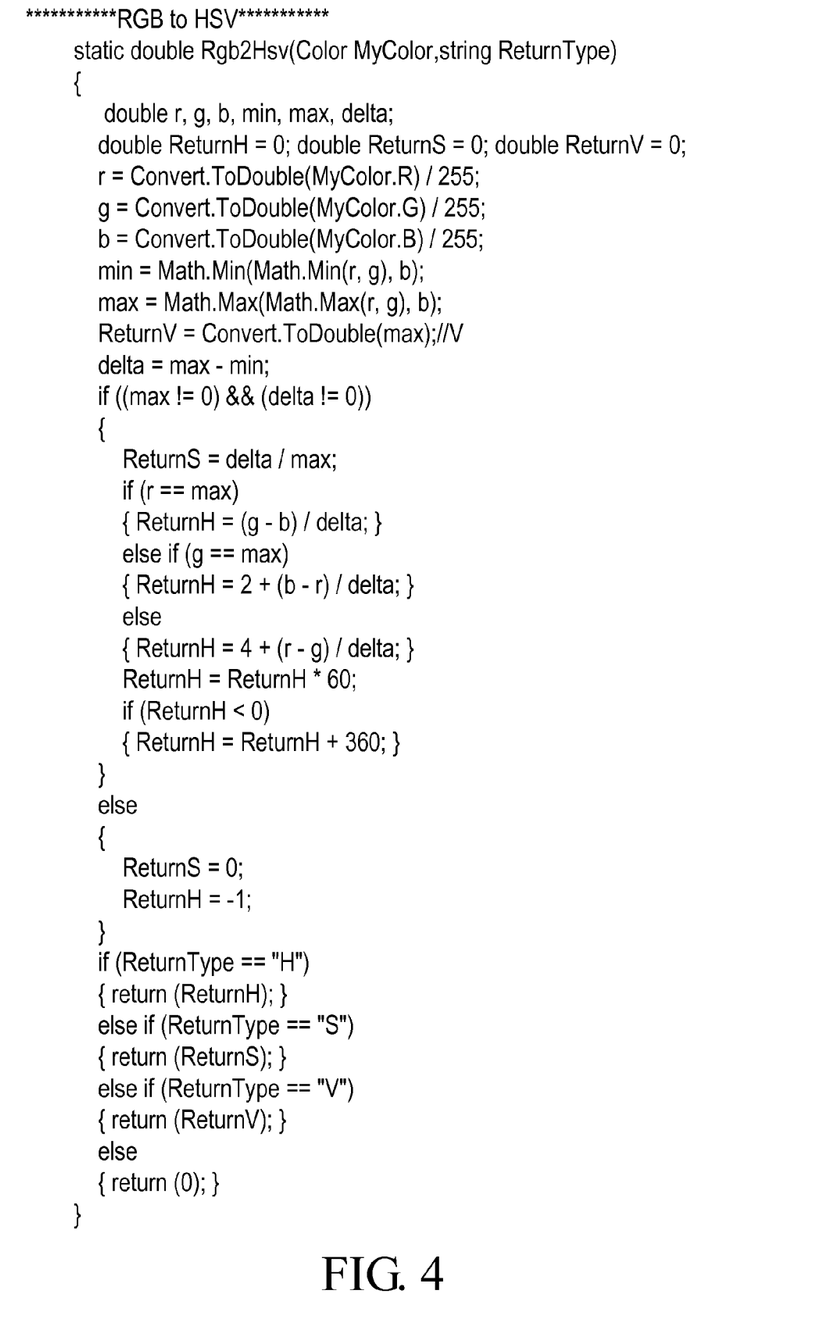
FIG. 4 is a schematic graph of C# codes for an RGB to HSV transform according to the invention.

FIG. 4 is a schematic diagram of C# codes for an RGB to HSV transform according to the invention. Those skilled in the art can rewrite the codes into Verilog or VHDL codes for implementing the RGB to HSV color space transform unit 210.

The skin tone optimization unit 220 is connected to the RGB to HSV color space transform unit 210 in order to perform a skin tone optimization on the HSV image signal for generating an adjusted saturation gain S_gain'(H).

The color enhancement unit 230 is connected to the skin tone optimization unit 220 and the RGB to HSV color space transform unit 210 in order to perform a color enhancement on the HSV image signal according to the adjusted saturation gain S_gain'(H) and a color shift signal H_shift(H) so as to generate a color enhancement signal (S', H', V).

The HSV-to-RGB color space transform unit 240 is connected to the color enhancement unit 230 in order to transform the color enhancement signal (S', H', V) from the HSV color domain to the RGB color domain.

Figure 5:
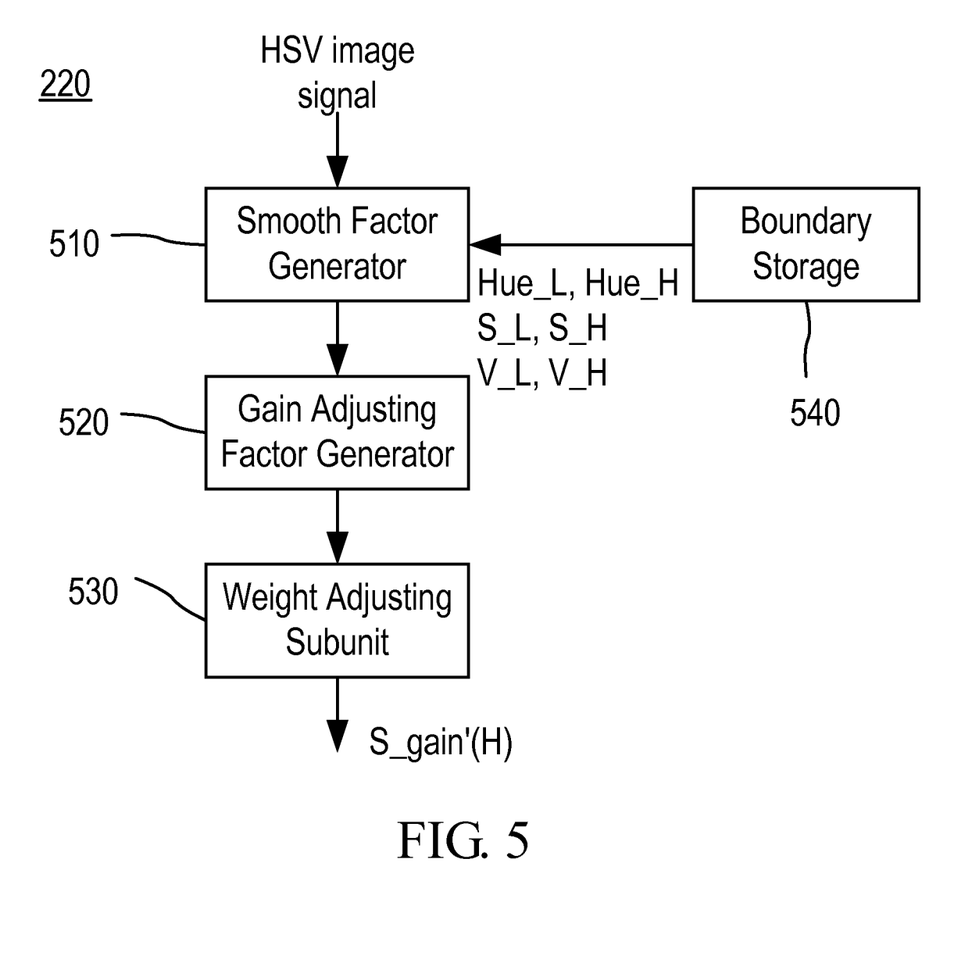
FIG. 5 is a block diagram of a skin tone optimization unit according to the invention.

FIG. 5 is a block diagram of the skin tone optimization unit 220 according to the invention. The skin tone optimization unit 220 includes a smooth factor generator 510, a gain adjusting factor generator 520, a weight adjusting subunit 530, and a boundary storage 540.

The boundary storage 540 stores color boundaries (Hue_L, Hue_H), saturation boundaries (S_L, S_H), and brightness boundaries (V_L, V_H) to thereby define a skin tone for the smooth factor generator 510. The lower color boundary Hue_L is 0 degree, and the upper color boundary Hue_H is 60 degrees. The lower saturation boundary S_L is 0, and the upper saturation boundary S_H is 0.7. The lower brightness boundary V_L is 0.3, and the upper brightness boundary V_H is 0.7. Namely, when Hue_L<Hue_skin<Hue_H, S_L<S_skin<S_H and V_L<V_skin<V_H, it describes the corresponding pixel to show the skin tone of a person. The color boundaries (Hue_L, Hue_H), the saturation boundaries (S_L, S_H), and the brightness boundaries (V_L, V_H) are written in the boundary storage 540 through a serial bus to thereby define the skin tones of human races.

The smooth factor generator 510 receives the HSV image signal, the color boundaries (Hue_L, Hue_H), the saturation boundaries (S_L, S_H), and the brightness boundaries (V_L, V_H) to thereby generate a hue smooth factor factor_H, a saturation smooth factor factor_S, and a brightness smooth factor factor_V. The hue smooth factor factor_H can be expressed as the following equation:

$$\text{factor\_H} = 1 - \frac{|H - 1/2(\text{Hue\_L} + \text{Hue\_H})|}{1/2(\text{Hue\_L} + \text{Hue\_H})},$$

the saturation smooth factor factor_S can be expressed as the following equation:

$$\text{factor\_S} = 1 - \frac{|S - 1/2(\text{S\_L} + \text{S\_H})|}{1/2(\text{S\_L} + \text{S\_H})},$$

and the brightness smooth factor factor_V can be expressed as the following equation:

$$\text{factor\_V} = 1 - \frac{|V - 1/2(\text{V\_L} + \text{V\_H})|}{1/2(\text{V\_L} + \text{V\_H})},$$

where factor_H indicates the hue smooth factor; factor_S indicates the saturation smooth factor; factor_V indicates the brightness smooth factor; H, S, V respectively indicate the hue, saturation, brightness components of the HSV image signal; Hue_L, Hue_H indicate the lower and upper color (hue) boundaries respectively; S_L, S_H indicate the lower and upper saturation boundaries; V_L, V_H indicate the lower and upper brightness boundaries.

The gain adjusting factor generator 520 is connected to the smooth factor generator 510 in order to perform a mean operation for generating a gain adjusting factor (alpha) according to the hue smooth factor factor_H, the saturation smooth factor factor_S, and the brightness smooth factor factor_V. The gain adjusting factor (alpha) can be expressed as the following equation:

alpha=⅓(factor_*H*+factor_*S*+factor_*V*), where alpha indicates the gain adjusting factor.

The weight adjusting subunit 530 is connected to the gain adjusting factor generator 520 in order to use the gain adjusting factor (alpha) to perform a weight adjustment on a saturation gain S_gain(H) and a skin tone gain Skin_gain for generating the adjusted saturation gain S_gain'(H). The adjusted saturation gain S_gain'(H) can be expressed as the following equation:

S_gain'(*H*)=(1−alpha)×S_gain+alpha×Skin_gain, where S_gain'(H) indicates the adjusted saturation gain, S_gain indicates the saturation gain, and skin_gain indicates the skin tone gain.

Figure 6:
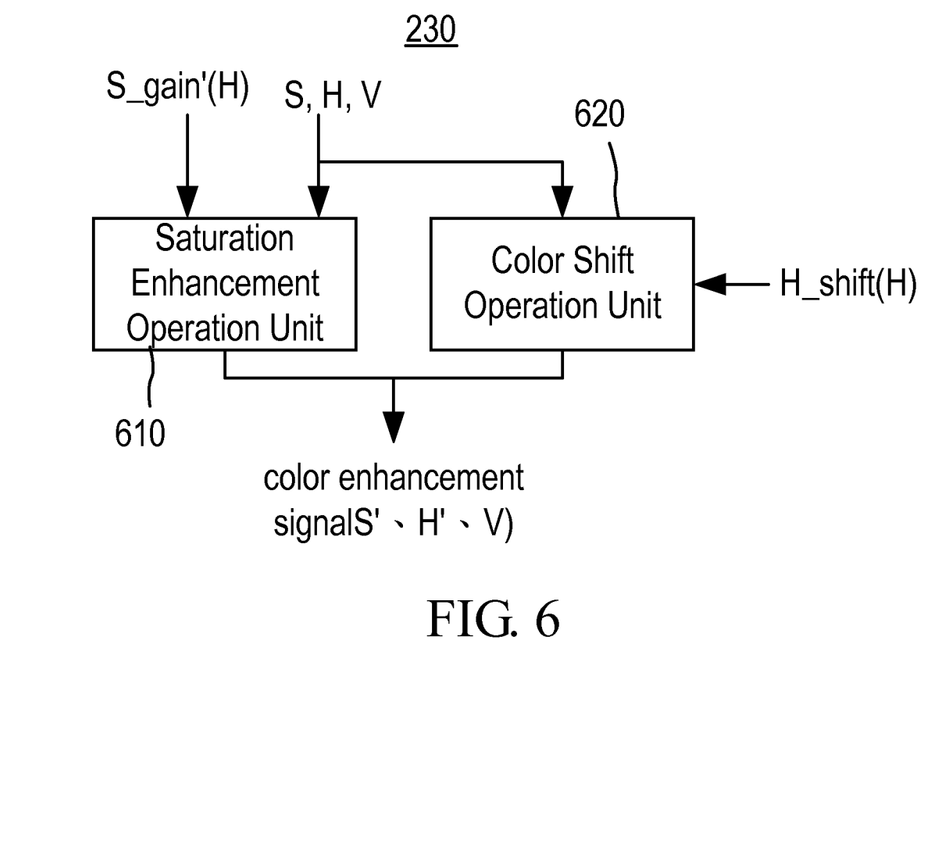
FIG. 6 is a block diagram of a color enhancement unit according to the invention.

FIG. 6 is a block diagram of the color enhancement unit 230 according to the invention. The color enhancement unit 230 includes a saturation enhancement operation unit 610 and a color shift operation unit 620. The saturation enhancement operation unit 610 and the color shift operation unit 620 are connected to the skin tone optimization unit 220 in order to enhance and adjust the saturation S and hue H of the HSV image signal according to the adjusted saturation gain S_gain'(H) and the color shift signal H_shift(H), so as to generate the color enhancement signal (S', H', V). A saturation value S' of the color enhancement signal can be expressed as the following equation:

$$S'=S \times S\_gain'(H),$$

where S_gain'(H) indicates the adjusted saturation gain and S indicates a saturation component of the HSV image signal. A hue value H' of the color enhancement signal can be expressed as the following equation:

$$H'=H+H\_shift(H),$$

where H_shift(H) indicates the color shift signal and H indicates a hue component of the HSV image signal.

The invention defines the skin tone range with the HSV model, and adjusts the gain to protect a skin tone. In addition, when the color saturation is being enhanced, the skin tone is not over-enhanced, as in the prior art, and thus the skin color will not become brown and unnatural. Accordingly, the natural skin tone is maintained while the color saturation is increased. Namely, the inventive skin tone protection mechanism is added in the typical image processing system to perform the skin tone optimization. The gain adjustment in the invention can be suitable for different color space image processing systems.

Figure 7:
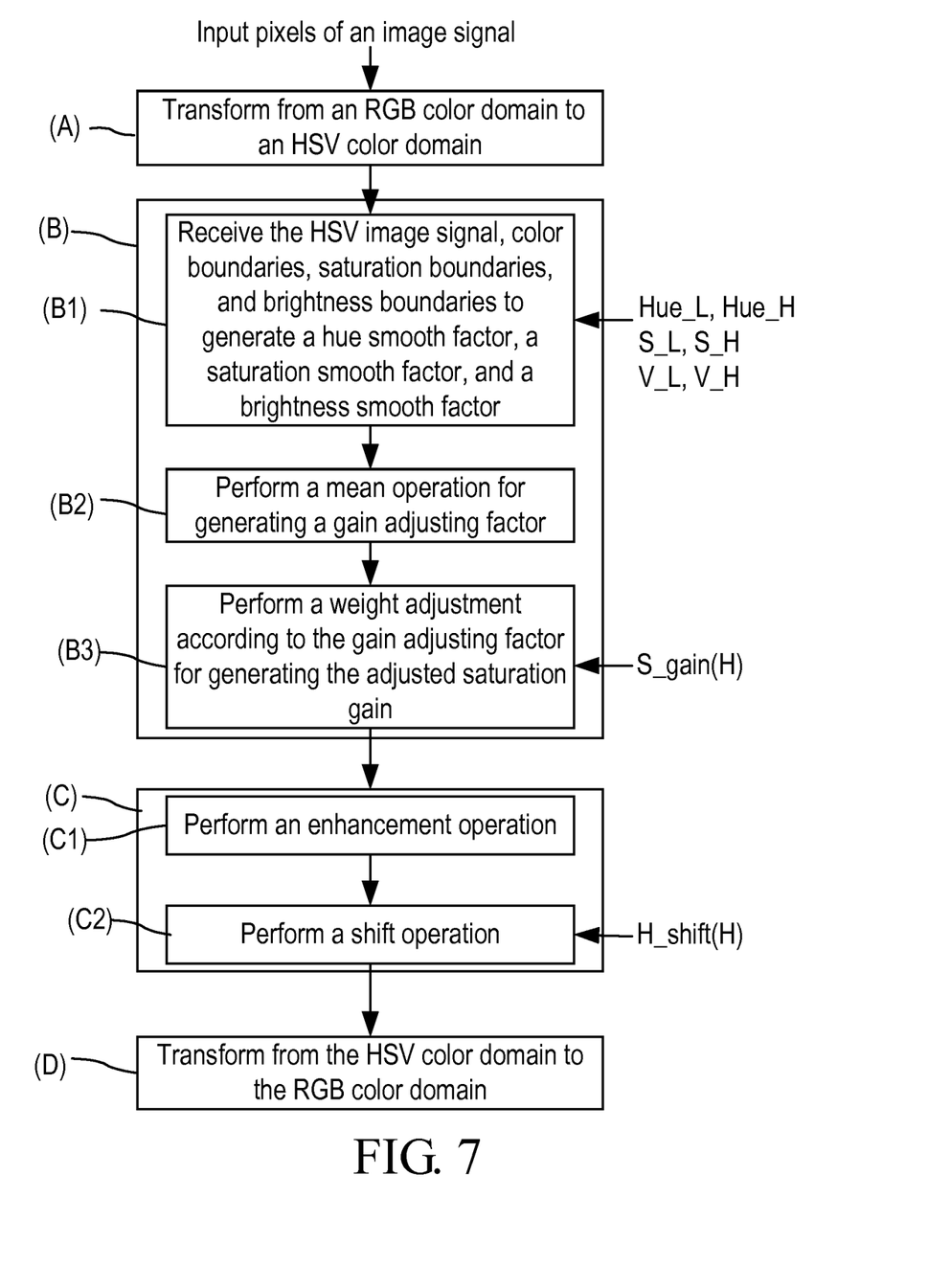
FIG. 7 is a flowchart of a method of skin tone optimization in a color gamut mapping system according to the invention.

FIG. 7 is a flowchart of a method of skin tone optimization in a color gamut mapping system according to the invention. The method is implemented in an image processor in order to process an input image signal. In the method, step (A) transforms an image signal from a predetermined color domain (RGB color domain) to an HSV color domain for generating an HSV image signal. Transforming the image signal from the predetermined color domain to the HSV color domain can be derived from an equation as follows:

$$H1 = \cos^{-1}\left\{\frac{0.5[(R-G)+(R-B)]}{\sqrt{(R-G)^2+(R-B)(G-B)}}\right\},$$

$$H = \begin{cases} H1, & B \leq G \\ 360° - H1, & B > G \end{cases},$$

$$S = \frac{\text{Max}(R,G,B)-\text{Min}(R,G,B)}{\text{Max}(R,G,B)},$$

$$V = \frac{\text{Max}(R,G,B)}{255},$$

where H1 indicates a temporary hue value and R, G, B respectively indicate red, green, blue components of the image signal.

Step (B) performs a skin tone optimization on the HSV image signal for generating an adjusted saturation gain S_gain'(H).

Step (B) can be divided into steps (B1), (B2), and (B3). Step (B1) receives the HSV image signal, the color boundaries (Hue_L, Hue_H), the saturation boundaries (S_L, S_H), and the brightness boundaries (V_L, V_H) to thereby generate a hue smooth factor factor_H, a saturation smooth factor factor_S, and a brightness smooth factor factor_V. The hue smooth factor factor_H can be expressed as the following equation:

$$\text{factor\_H} = 1 - \frac{|H - 1/2(\text{Hue\_L}+\text{Hue\_H})|}{1/2(\text{Hue\_L}+\text{Hue\_H})},$$

the saturation smooth factor factor_S can be expressed as the following equation:

$$\text{factor\_S} = 1 - \frac{|S - 1/2(S\_L+S\_H)|}{1/2(S\_L+S\_H)},$$

and the brightness smooth factor factor_V can be expressed as the following equation:

$$\text{factor\_V} = 1 - \frac{|V - 1/2(V\_L+V\_H)|}{1/2(V\_L+V\_H)},$$

where factor_H indicates the hue smooth factor; factor_S indicates the saturation smooth factor; factor_V indicates the brightness smooth factor; H, S, V indicate hue, saturation, brightness components of the HSV image signal; Hue_L, Hue_H indicate lower and upper hue boundaries; S_L, S_H indicate lower and upper saturation boundaries; and V_L, V_H indicate lower and upper brightness boundaries.

Step (B2) is based on the hue smooth factor factor_H, the saturation smooth factor factor_S, and the brightness smooth factor factor_V to perform a mean operation for generating a gain adjusting factor (alpha). The gain adjusting factor (alpha) can be expressed as an equation as follows:

$$\text{alpha}=\frac{1}{3}(\text{factor}\_H+\text{factor}\_S+\text{factor}\_V).$$

where alpha indicates the gain adjusting factor.

Step (B3) uses the gain adjusting factor (alpha) to perform a weight adjustment on a saturation gain S_gain(H) and a skin tone gain Skin_gain. The adjusted saturation gain S_gain'(H) can be expressed as the following equation:

$$S\_gain'(H)=(1-\text{alpha})\times S\_gain+\text{alpha}\times\text{Skin\_gain},$$

where S_gain'(H) indicates the adjusted saturation gain, S_gain indicates the saturation gain, and skin_gain indicates the skin tone gain.

Step (C) performs a color enhancement on the HSV image signal according to the adjusted saturation gain S_gain'(H) and a color shift signal H_shift(H), so as to generate a color enhancement signal.

Moreover, step (C) can be divided into steps (C1) and (C2). Step (C1) receives the HSV image signal, the adjusted saturation gain S_gain'(H), and the color shift signal H_shift(H) in order to perform an enhancement operation on a saturation S of the HSV image signal for generating a saturation value S' of the color enhancement signal. The saturation value S' of the color enhancement signal can be expressed as the following equation:

$$S'=S \times S\_gain'(H),$$

where S_gain'(H) indicates the adjusted saturation gain and S indicates the saturation component of the HSV image signal.

Step (C2) performs a shift operation on a hue H of the HSV image signal for generating a hue value H' of the color enhancement signal. The hue value H' of the color enhancement signal can be expressed as the following equation:

$$H'=H+H\_shift(H),$$

where H_shift(H) indicates the color shift signal and H indicates the hue component of the HSV image signal.

Step (D) transforms the color enhancement signal from the HSV color domain to the predetermined color domain (RGB color domain).

As cited, the invention first transforms the pixels of an input image signal from RGB color domain to HSV color domain. Since the HSV model is based on the human natural feeling color description to develop an ideal tool of image processing, it can define a skin tone range, protect the skin tones, and adjust the gain. While the color saturation is enhanced, the skin tones are not over-enhanced. This is because the skin tones of an image do not become brown and unnatural after performing the inventive process. Therefore, in the invention, the skin tones can be maintained in nature while the color saturation is increased, and the skin tone optimization can be performed on the skin tones. Further, the gain adjustment in the invention can be suitable for different color space image processing systems.

Although the present invention has been explained in relation to its preferred embodiment, it is to be understood that many other possible modifications and variations can be made without departing from the spirit and scope of the invention as hereinafter claimed.

What is claimed is:

1. A method of skin tone optimization in a color gamut mapping system, which is implemented in an image processor for performing the steps of:
   (A) transforming an image signal from a predetermined color domain to an HSV (Hue, Saturation, Value) color domain for generating an HSV image signal;
   (B) performing a skin tone optimization on the HSV image signal for generating an adjusted saturation gain, wherein step (B) comprises the steps of:
   (B1) receiving the HSV image signal, color boundaries, saturation boundaries, and brightness boundaries to generate a hue smooth factor, a saturation smooth factor, and a brightness smooth factor;
   (B2) generating a gain adjusting factor by performing a mean operation according to the hue smooth factor, the saturation smooth factor, and the brightness smooth factor; and
   (B3) performing a weight adjustment on a saturation gain and a skin tone gain according to the gain adjusting factor;
   (C) performing a color enhancement on the HSV image signal according to the adjusted saturation gain and a color shift signal so as to generate a color enhancement signal; and
   (D) transforming the color enhancement signal from the HSV color domain to the predetermined color domain.

2. The method as claimed in claim 1, wherein the hue smooth factor is expressed as:

$$\text{factor\_H} = 1 - \frac{|H - 1/2(\text{Hue\_L} + \text{Hue\_H})|}{1/2(\text{Hue\_L} + \text{Hue\_H})},$$

the saturation smooth factor is expressed as:

$$\text{factor\_S} = 1 - \frac{|S - 1/2(S\_L + S\_H)|}{1/2(S\_L + S\_H)},$$

and the brightness smooth factor is expressed as:

$$\text{factor\_V} = 1 - \frac{|V - 1/2(V\_L + V\_H)|}{1/2(V\_L + V\_H)},$$

where factor_H indicates the hue smooth factor; factor_S indicates the saturation smooth factor; factor_V indicates the brightness smooth factor; H, S, V indicate hue, saturation, brightness components of the HSV image signal; Hue_L, Hue_H indicate the color boundaries; S_L, S_H indicate the saturation boundaries; V_L, V_H indicate the brightness boundaries.

3. The method as claimed in claim 2, wherein the gain adjusting factor is expressed as:

alpha=⅓(factor_H+factor_S+factor_V), where alpha indicates the gain adjusting factor.

4. The method as claimed in claim 3, wherein the adjusted saturation gain is expressed as:

$S\_\text{gain}'(H) = (1-\text{alpha}) \times S\_\text{gain} + \text{alpha} \times \text{Skin\_gain}$, where S_gain'(H) indicates the adjusted saturation gain, S_gain indicates the saturation gain, and skin_gain indicates the skin tone gain.

5. The method as claimed in claim 4, wherein step (C) comprises the steps of:
   (C1) receiving the HSV image signal, the adjusted saturation gain, and the color shift signal to perform an enhancement operation on a saturation component of the HSV image signal, so as to generate a saturation value of the color enhancement signal; and
   (C2) performing a shift operation on a hue component of the HSV image signal for generating a hue value of the color enhancement signal.

6. The method as claimed in claim 5, wherein the saturation value of the color enhancement signal is expressed as:

$S' = S \times S\_\text{gain}'(H)$, where S' indicates the saturation value, S_gain'(H) indicates the adjusted saturation gain, and S indicates the saturation component of the HSV image signal, and the hue value of the color enhancement signal is expressed as:

$H' = H + H\_\text{shift}(H)$, where H' indicates the hue value, H_shift(H) indicates the color shift signal, and H indicates the hue component of the HSV image signal.

7. The method as claimed in claim 1, wherein the predetermined color domain is an RGB (Red, Green, Blue) color domain.

8. The method as claimed in claim 7, wherein transforming an image signal from a predetermined color domain to an HSV color domain in step (A) is expressed as:

$$H1 = \cos^{-1}\left\{\frac{0.5[(R-G)+(R-B)]}{\sqrt{(R-G)^2+(R-B)(G-B)}}\right\},$$

$$H = \begin{cases} H1, & B \leq G \\ 360° - H1, & B > G \end{cases},$$

$$S = \frac{\text{Max}(R, G, B) - \text{Min}(R, G, B)}{\text{Max}(R, G, B)},$$

$$V = \frac{\text{Max}(R, G, B)}{255},$$

where H1 indicates a temporary hue value, R indicates a red component of the image signal, G indicates a green component of the image signal, and B indicates a blue component of the image signal.

* * * * *